United States Patent [19]

Sullivan

[11] Patent Number: 4,773,005
[45] Date of Patent: Sep. 20, 1988

[54] DYNAMIC ADDRESS ASSIGNMENT SYSTEM

[75] Inventor: James P. Sullivan, Portland, Oreg.

[73] Assignee: Tektronix, Inc., Beaverton, Oreg.

[21] Appl. No.: 98,759

[22] Filed: Sep. 17, 1987

Related U.S. Application Data

[63] Continuation of Ser. No. 648,541, Sep. 7, 1984, abandoned.

[51] Int. Cl.⁴ .............................................. G06F 13/10
[52] U.S. Cl. ...................................................... 364/200
[58] Field of Search ... 364/200 MS File, 900 MS File; 340/825.08

[56] References Cited

U.S. PATENT DOCUMENTS

| | | | |
|---|---|---|---|
| 4,017,831 | 4/1977 | Tieden et al. | 364/518 |
| 4,034,347 | 7/1977 | Probert | 364/200 |
| 4,177,515 | 12/1979 | Jenkins et al. | 364/200 |
| 4,253,146 | 2/1981 | Bellamy et al. | 364/200 |
| 4,268,901 | 5/1981 | Subrizi et al. | 364/200 |
| 4,562,535 | 12/1985 | Vincent et al. | 364/200 |
| 4,622,633 | 11/1986 | Ceccon et al. | 364/200 |

Primary Examiner—Gary V. Harkcom
Assistant Examiner—Lawrence E. Anderson
Attorney, Agent, or Firm—John P. Dellett; Robert S. Hulse

[57] ABSTRACT

For a computer system having peripheral devices coupled to a common bus through interface devices transmitting and receiving messages containing an address code matching a stored address code, a dynamic address assignment system stores a unique address code in each interface device following system startup. On system start up each interface device stores a type number and an adjustable serial number, type numbers for peripheral devices of the same type being identical while serial numbers for all peripheral devices of the same type are adjusted to different values. A master controller transmits to all peripheral devices a series of universally addressed count commands. Each interface device counts the count commands and, when the count reaches a poll number determined by the unique combination of stored type and serial numbers, requests and obtains a unique address code from the host computer. The interface device thereafter stores and uses the unique address code in transmitting and receiving messages on the bus.

6 Claims, 3 Drawing Sheets

DYNAMIC ADDRESS ASSIGNMENT SYSTEM

This is a continuation of application Ser. No. 648,541, filed Sept. 7, 1984, and now abandoned.

BACKGROUND OF THE INVENTION

The present invention relates in general to computer systems employing a common serial data bus to provide communication links between a host computer and more than one peripheral device and particularly to a method and apparatus for dynamically assigning addresses to each peripheral device on the bus.

When more than one peripheral device, such as a keyboard, joystick or digitizer must communicate with a host computer through a common serial data bus, the computer must be able to tell which peripheral device has sent any particular data received by the computer over the bus. Also when the computer sends data to some peripheral device on the bus, the selected device must know that the data is intended for it. All other peripheral devices must know that the data should be ignored. In the prior art it is common to establish a data transmission protocal whereby all data transmissions to or from peripheral devices contain peripheral addressing information, usually at the beginning of the transmission. Each peripheral device is assigned a unique address and incorporates that address into every data transmission to the computer. Likewise the computer incorporates the unique address of the selected peripheral device in every transmission to each peripheral. Each peripheral device is designed to respond to data transmissions containing only its unique address code and to ignore others.

In the prior art, the unique address of each peripheral device is typically established through adjustment of hardware in the device such as, for instance, through setting switches or through data stored in a read only memory (ROM) contained in each device. A communication controller in each peripheral device is then programmed to respond only to messages containing addresses matching the number stored in ROM or set by the switches. One disadvantage of using a ROM in each peripheral device is that the ROM must be different for each device. If, for instance, two keyboards are connected to the same bus, the ROM in one keyboard must be altered.

Use of switches in each peripheral device makes it easier for a user to give each device a unique address. However a large number of switches must be used if the address uses several bits to accommodate a large number of peripheral devices. Requiring a user to set a large number of switches accurately presents an opportunity for human error.

It would be advantageous if peripheral devices could be added to a serial bus without the need for changing ROMs in any peripheral device or without the need for setting the entire device address in switches in the peripheral devices.

SUMMARY OF THE INVENTION

The present invention is a method and apparatus for dynamically addressing a plurality of peripheral devices communicating with a central or "host" computer over a single serial data bus. Each peripheral device contains a remote universal peripheral interface device (PID) and a set of four switches. The host computer is connected to a master controller through a bidirectional parallel port. The master controller and all PIDs each have a serial port connected to the serial data bus. Thus all information passing between the host computer and a peripheral device passes through the master and corresponding PIDs.

Each PID contains a ROM storing a number representing the peripheral type. The peripheral type number stored by, for instance, a keyboard PID will differ from the peripheral type number stored in a joystick PID. However the type number stored in the PIDs of two identical keyboards will be identical.

The four switches in each peripheral device are used to distinguish between two peripherals of the same type. For instance, if two keyboards of the same type, having the same identifying peripheral type number are connected to the same serial bus, then the switches are set differently. Each switch has two possible positions. Since the four switches on any peripheral device may be set in any of 16 different switch position combinations, the switches may be set to distinguish between as many as 16 peripheral devices of the same type. The actual combination of switch positions on any particular peripheral device is not important as long it does not match that of another peripheral of the same type on the bus. Each PID places a serial number (from 1 to 16 decimal) representing the particular switch settings in an internal register.

On system start up each PID is programmed to initially accept commands or data transmitted with a universal address code. The host computer initiates a "configuration cycle" causing the master controller to transmit a series of "CONFIG" commands to the PIDs with the universal address code. The CONFIG command is thus recognized by all PIDs and each PID counts CONFIG commands received. When the count reaches a poll number related to a unique combination of the the type and serial numbers associated with the PID, the PID transmits a "REQUEST SID" message to the master controller. The REQUEST SID message contains the peripheral type number and the switch position code. On receipt of a "REQUEST SID" message, the master PID stops transmitting CONFIG commands, and transmits the peripheral type number and switch position code to the host computer. The host computer then determines a "short identification number" (SID number) to be used as an address code for the peripheral and then issues an "ASSIGN SID" command. The ASSIGN SID command is transmitted over the serial bus by the master controller along with the type number and serial number received in the REQUEST SID message and the SID number.

The PID sending the REQUEST SID message is programmed to respond to an ASSIGN SID command containing its own peripheral type number and serial number and the ASSIGN SID command causes the PID to store the SID number in an internal address register. Thereafter the PID will respond to any incomming message transmitted under that particular SID number and will include that SID number in every outgoing message. The SID number thus becomes that peripherals unique address until the system is restarted.

After transmitting the ASSIGN SID command, the master controller resumes issuing CONFIG commands until it reaches a preset count limit equal to highest possible poll number associated with any PID. On reaching the count limit the configuration cycle is complete, each peripheral having requested and obtained a unique SID number address. Subsequent communications between host and peripherals may then be transmitted using SID number address codes.

The present invention thus allows the host computer to establish peripheral addresses dynamically after system start up. All peripherals of the same type contain the same ROM and no manual adjustment to peripheral hardware is required to distinguish peripherals unless two peripherals of the same type are connected to the same serial bus. In that case an operator must adjust switch settings in the duplicate peripheral but the exact setting of the switches is not critical so long as the settings do not duplicate the settings of the switches on similar peripherals. Opportunity for operator error is small.

Since all devices of the same type have the same pripheral type number, the host computer can be programmed to recognize the peripheral type during start up when it receives the peripheral type number. Once the host recognizes the peripheral type, it can communicate with the peripheral through preprogrammed, specifically adapted drivers. Thus the present invention not only dynamically addresses the peripherals, it provides a means for the host computer to identify peripheral types automatically.

It is therefore an object of the present invention to provide new and improved method and apparatus for assigning addresses to each peripheral device connected to a single serial bus.

It is a further object of the present invention to provide such new and improved address assigning method and apparatus whereby no change in peripheral device hardware is required to distinguish peripheral devices of differing types.

It is a further object of the present invention to provide such new and improved address assigning method and apparatus whereby only a simple change in peripheral device hardware is required to distinguish peripheral devices of the same type.

It is a still further object of the present invention to provide such new and improved address method and apparatus whereby during system startup a host computer can automatically determine the type of each peripheral connected to a serial bus.

The invention resides in the combination, construction, arrangement and disposition of the various component parts and elements incorporated in the present invention. The present invention will be better understood and objects and important features other than those specifically enumerated above will become apparent when consideration is given to the following details and description, which when taken in conjunction with the annexed drawings describe, disclose, illustrate, and show a preferred embodiment or modification of the present invention and what is presently considered and believed to be the best mode of practicing the principles thereof.

DETAILED DESCRIPTION OF THE PREFERRED EMBODIMENT

Figure 1:
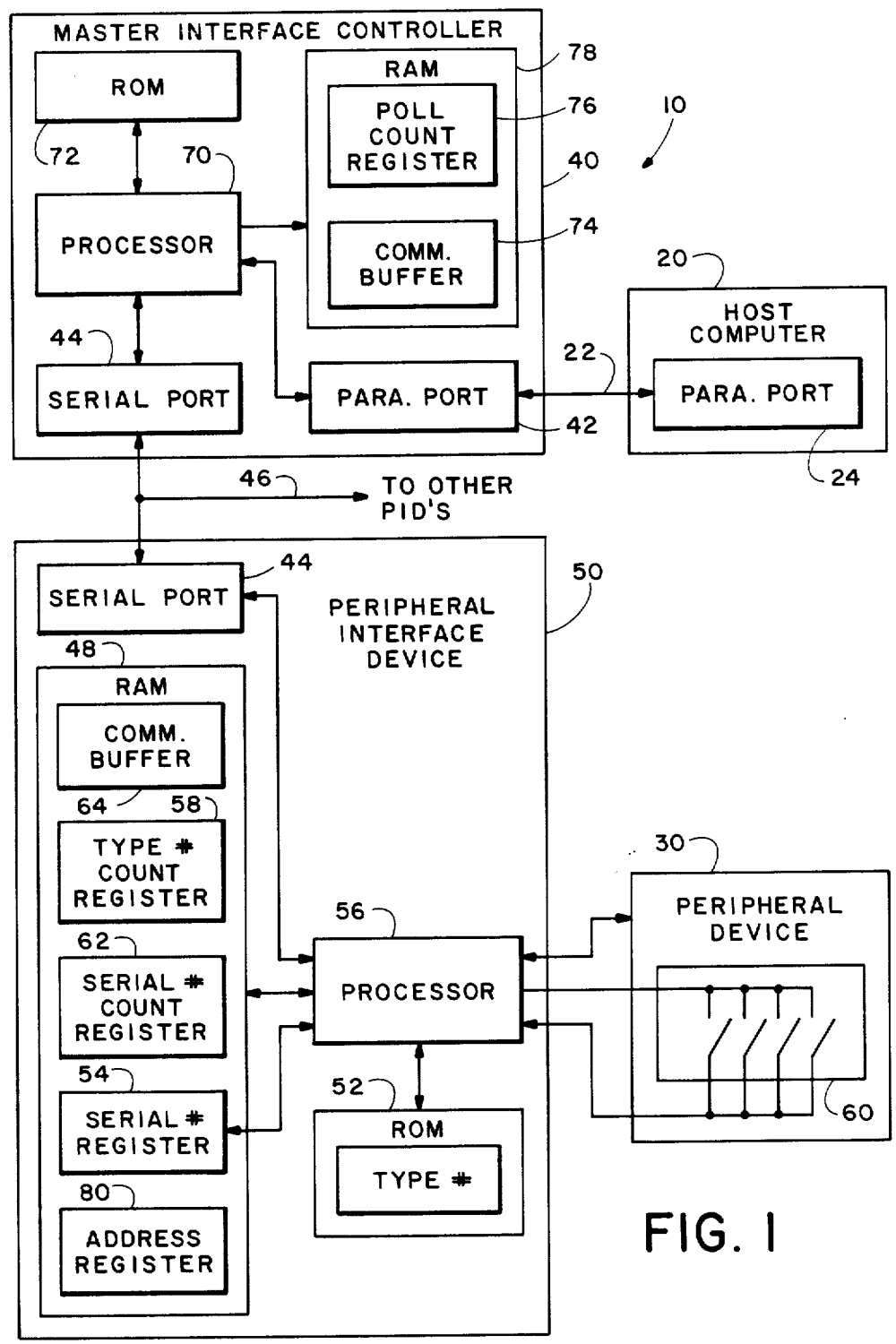
FIG. 1 is a block diagram depicting a system incorporating the preferred embodiment of the present invention.

FIG. 1 is a block diagram of a modular input system (MIS) 10 incorporating the present invention for providing a communication link between host computer 20 and one or more peripheral devices 30 such as keyboards, joysticks or digitizers. Modular input system 10 comprises master controller 40, one or more peripheral interface device (PIDs) 50, and one bank of four switches 60 for each PID.

Host computer 20 communicates with master controller 40 through parallel bus 22 coupling bidirectional parallel port 24 in the host computer to parallel port 42 in the master controller. MIS controller 40 and each PID 50 has a serial port 44 all connected to form the serial modular interface bus 46. All information passing between host computer 20 and any peripheral device 50 passes through master controller 40, serial bus 46 and a PID 50.

Each PID 50 contains a read only memroy (ROM) 52 which stores a number representing the peripheral type. The peripheral type number stored in, for instance, a keyboard PID will differ from the peripheral type number stored in a joystick PID. However the type number associated with two identical keyboards will be identical.

Switch bank 60, which may be mounted in peripheral device 30, is used to distinguish between two peripheral devices of the same type. For instance, if two keyboards of the same type, having the same identifying peripheral type number are connected to the same serial bus, then the switches in bank 60 are set differently. Each switch in bank 60 has two possible switch positions. Since the four switches in bank 60 on any peripheral device 30 may be set in any of 16 different switch position combinations, the switches may be set to distinguish between as many as 16 peripheral devices of the same type. The actual combination of switch positions on any particular peripheral device 30 is not important as long as the combination of switch positions of one peripheral device does not match that of another peripheral device of the same type. Each PID 50 interrogates the switch positions and places a number (from 0 to 15 decimal) representing the particular switch settings in serial number register 54 which may be contained in random access memory (RAM) 48 accessed by processor 56.

Each PID 50 contains a type number count register 58, a serial number count register 62, address register 80 and a communication buffer 64, all of which may be contained in RAM 48. Processor 56 uses communication buffer 64 to temporarily store data transmitted over bus 46. The registers are explained below.

Master interface controller 40 also has a processor 70 controlled by a program contained in ROM 72, a communication buffer 74 for temporary storage of data transmitted over bus 46, and poll count register 76. Poll count register 76 and buffer 74 may be contained in RAM 78.

Figure 2:
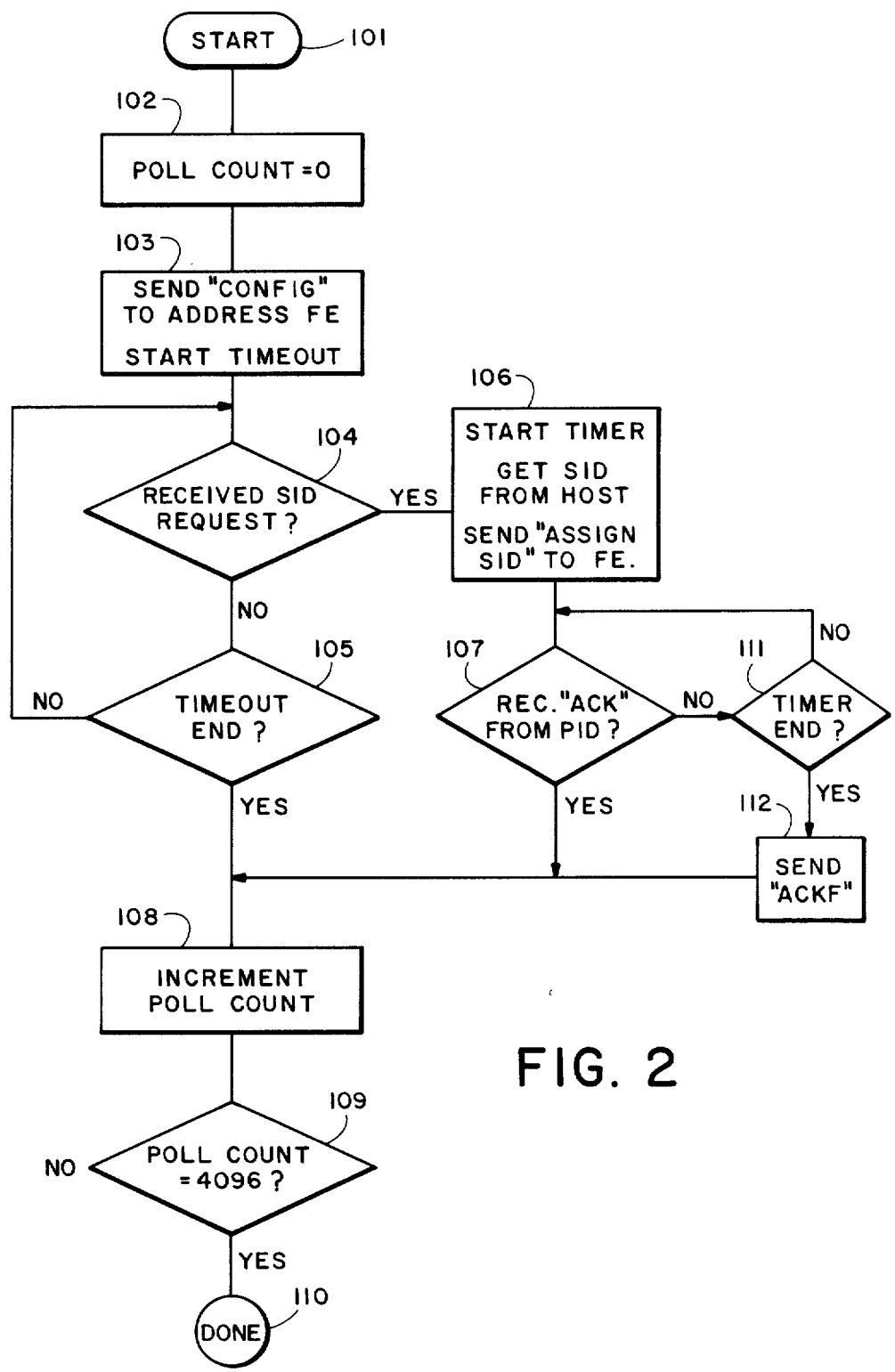
FIG. 2 is a flowchart depicting the configuration mode operation of the master interface controller of FIG. 1.

FIG. 2 is a flow chart of a routine contained in ROM 72 for controlling the operation of master interface controller 40 during system configuration following system start up. System configuration begins when controller 40 receives a "CONFIG" command from host computer 20 over bus 22. This occurs during system start up or reset. The purpose of the configuration routine is to allow host computer 20 to assign addresses to each peripheral device 30.

Referring to FIGS. 1 and 2, upon receipt of a CONFIG command from host computer 20 initiating start (block 101 of FIG. 2) of the configuration routine, system controller 40 (in block 102) sets poll count register 76 to zero, transmits a CONFIG command out on bus 46 to all PIDs 50 using universal address "FE" and starts a "TIMEOUT" timer. In blocks 104 and 105 conroller 40 waits for for the duration of the TIMOUT timer to see if any PID 50 responds with a "REQUEST SID" message. This indicates that a peripheral device 30 is requesting a "short identification" (SID) number for use as the peripheral device address. If such a request is received from a peripheral device, controller 40, in block 106, obtains the SID number from host computer 20 and retransmits it in an "ASSIGN SID" command addressed to all peripherals using the universal address code FE. The ASSIGN SID command also contains information as explained below allowing the PID that sent the REQUEST SID message to accept the SID number while all other PIDs reject it. The accepting PID then transmits an "ACK" message to the controller 40 acknowledging receipt of the SID number. A second timer started in block 106 allows a set time for receipt of an ACK message. Blocks 107 and 111 form a loop causing controller 40 to wait for an ACK message. If no ACK message is received at the end of the TIMER cycle, controller 40 sends an "ACKF" message to the host informing the host of an acknowledgement failure.

After transmitting the SID number and receiving an ACK message from the receiving PID (block 107), or if no REQUEST SID message is received within the TIMEOUT time (block 105), or after sending an ACKF message to the host (block 112) controller 40, in block 108, increments the number contained in poll count register 76 by one and then, in block 109, checks to see if the stored number equals 4096, the maximum number of peripherals that can be tied to bus 46. After 4096 CONFIG commands have been generated, configuration is complete, block 110. If less than 4096 CONFIG commands have been generated, controller 40 transmits another CONFIG command in block 103 and the cycle begins again.

During system configuration, each PID counts the number of CONFIG commands placed on bus 46 by controller 40, incrementing type number count register 58 once for every 16 CONFIG commands. Serial number count register is incremented once for every CONFIG command but is reset to zero after every sixteen counts. When the count stored in type number count register 58 matches the peripheral type number stored in ROM 58, and when the number stored in serial number count register 62 matches the serial number stored in serial number count register 54, PID 50 transmits a REQUEST SID message to master controller 40 and receives an ASSIGN SID command in return containing the SID number as described above for use as its address code. Since the combination of serial number and type number is unique for each PID, each PID receives a unique SID number. Each PID 50 stores its SID number in address register 80.

Figure 3:
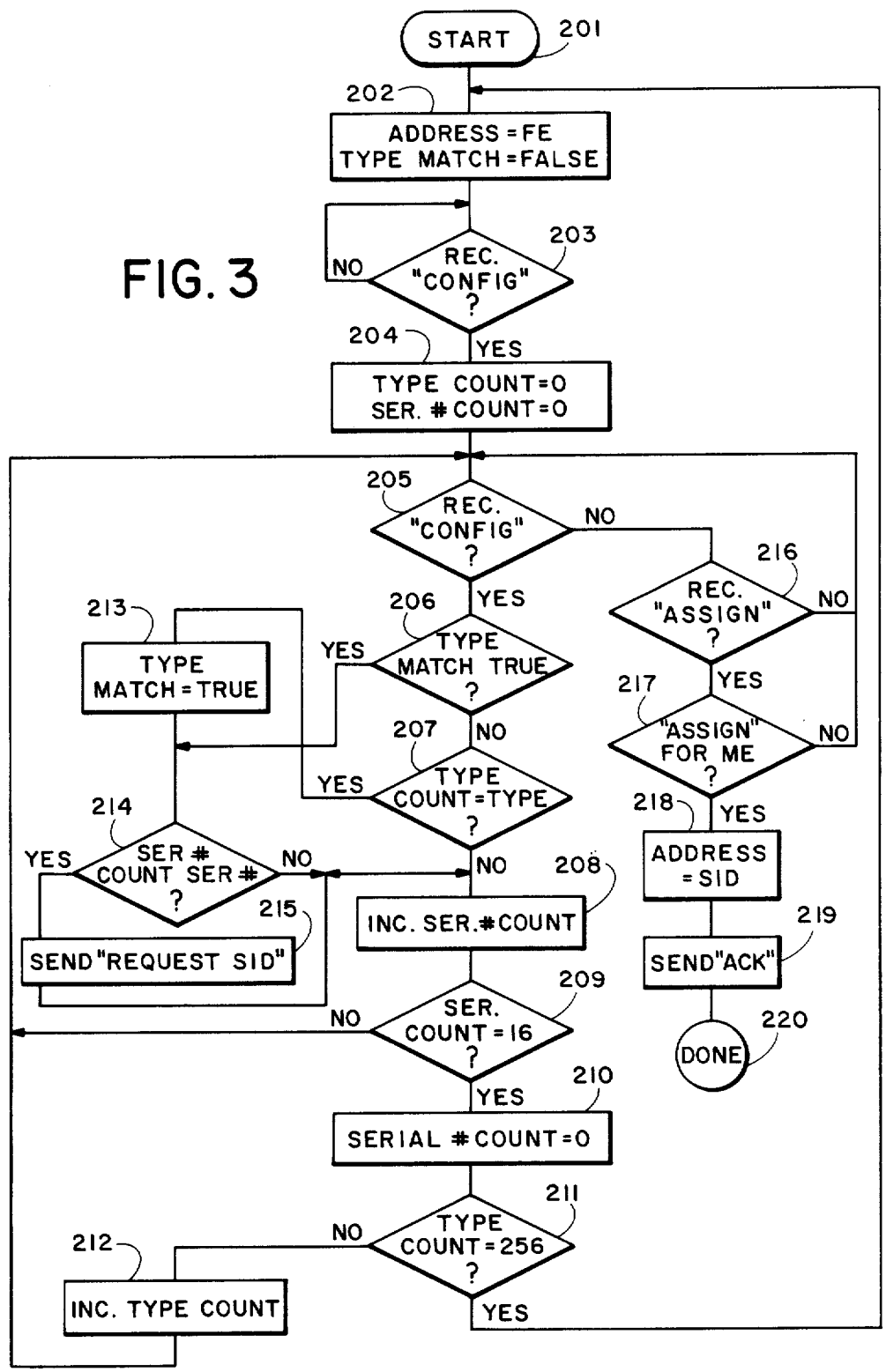
FIG. 3 is a flowchart depicting the configuration mode operation of the peripheral interface device of FIG. 1.

FIG. 3 is a flow chart of a program contained in ROM 52 for controlling the operation of PID 50 during system configuration. Turning now to FIGS. 1 and 3, the PID configuration routine starts at block 201 on system power up. In block 202, each PID 30 loads the hexadecimal number FE into address register 80. Each PID responds to information transmitted over bus 46 when preceeded by the number contained in register 80. Thus after system start-up, every PID 50 responds to messages sent to address FE. Also in block 202, each PID sets a "TYPE MATCH" marker to a logical false condition. This marker is used to indicate whether the CONFIG command count stored in type number count register 58 has reached the type number stored in ROM 50. A logical false condition indicates that a match has not yet occured.

With address FE in register 80 every PID 50 then waits in block 203 for the first CONFIG command transmitted by master controller 40 over bus 46. On receipt of the first CONFIG command, each PID zeros the contents of type number count register 58 and serial number count register 62 as indicated in block 204.

Each PID 50 then enters into a loop comprising blocks 205 and 216 wherein the PID continuously checks for the occurence of a CONFIG command or an ASSIGN SID command on bus 46. When PID 50 receives a CONFIG command from controller 40, it checks in block 206 to see if the type match marker is true. If not, it increments serial number count register 62. In block 209, PID 50 checks to see if the count in serial number count register 62 has reached 16. If not, PID 50 returns operation to blocks 205 and 216 and waits for another CONFIG command. If the count in serial number count register 62 has reached 16, PID 50 resets the serial number count to zero in block 210.

In block 211, PID 50 checks to see if the number contained in type count number register 58 is equal to 256. The type number count will reach 256 after 4096 CONFIG commands have been received by the PID. This is the maximum number to be sent. In normal operation, each PID will receive a SID number before 4096 CONFIG commands have issued. If the PID has not received a SID number by the time 4096 CONFIG commands have issued, then there is a configuration error. At that point an error message could be generated. However, in FIG. 3, in the event of such an error, PID operation is redirected back to block 202 and the PID retains the universal address FE following configuration.

Assuming the count stored in type number register 211 has not reached 256 when the configuration routine reacher block 211, PID 50 increments type number count register 58 in block 212 and then returns to block 205 to wait for another CONFIG command.

When the count stored in type number count register 58 reaches the peripheral type number stored in ROM 52, block 207 directs PID 50 to block 213 where the type match marker is set to logical true. Thereafter, in 214, PID 50 compares the contents of serial number count register 62 with the peripheral serial number stored in register 54. If there is a match then PID 50 transmits a REQUEST SID message to controller 40 according to block 215. If there is no match, or after a REQUEST SID message is sent, the serial number count in register 62 is incremented in block 208 and PID 50 is directed back again to the blocks 205 and 216 loop to wait for another CONFIG command or an ASSIGN SID command. On receipt of subsequent CONFIG commands, block 206 will direct PID 50 directly to block 214, bypassing block 213 since the type match marker is already true.

It should be noted that only one PID 50 will send a REQUEST SID command at a time because the combination of type number and serial number is unique for each PID 50. The type number stored in ROM 50 is unique for each peripheral 30 type while the serial number in register 54 is uniquely set to distinguish between peripherals of the same type.

The REQUEST SID message, sent to controller 40 in block 215, contains the type and serial number of the initiating PID 50. Controller 40 passes this number to host computer 20. Host computer 20 may use this type number to identify the peripheral type so that it can later use the proper interface routines when communicating with the peripheral. Host computer 20 determines an appropriate SID number to use for the peripheral address and transmits it back to the PID 50 via an ASSIGN command. The ASSIGN command contains the type and serial number of the PID 50 making the SID request.

All PIDs 50 receive the ASSIGN command but only the requesting PID 50 stores the SID number transmitted in the ASSIGN command in its address register 80. In block 217, PID 50 compares the type and serial number data contained in the ASSIGN SID command with its own stored type and serial numbers. If the numbers do not match, the command is ignored by redirecting PID 50 operation back to block 205 to wait for another CONFIG or ASSIGN command. If the numbers do match, then in block 218, the PID stores the SID number in address register 80 and, in block 219, sends an ACK message to master controller 40 acknowledging acceptance of the SID number and enabling it to resume issuing CONFIG commands. Thereafter, the PID 50 storing the transmitted SID number in register 80 will respond to any message containing its assigned SID number. The configuration routine for any PID having accepted a SID number then ends in block 220.

By the time controller 40 has issued 4096 CONFIG commands, all PIDs 50 will have requested and received a unique SID number. Thereafter the host computer 20 and peripheral devices 30 will occur using the SID number addresses.

In the preferred embodiment master controller 40 and PID 50 comprise Intel mode 8744 remote universal peripheral interface microcomputers with ROMs programmed to implement a subset of IBM standard synchronous data link control protocol and to implement the routines charted in FIGS. 2 and 3 during initial configuration. It is understood, however, that the hardware requirements of controller 40 and PID 50 may be implemented by any microprocessor or controller comprising features analogous to those depicted in FIG. 1 and capable of being programmed to carry out the steps charted by FIGS. 2 and 3 without departing from the present invention. It is also understood that switch bank 60 could be replaced by a set of removable or cuttable jumpers, or any other method of generating a unique number for storage in serial number register 54 of FIG. 1.

The following is a simplified code listing implementing the flow chart of FIG. 2.

```
10   POLL = 0
20   SEND CONFIG TO ADDRESS FE
30   START TIMEOUT
40   IF SID REQUEST RECEIVED THEN GOTO 60
50   IF TIMEOUT LIMIT THEN GOTO 100
60   START TIMER
65   GET SID FROM HOST
70   SEND ASSIGN SID TO ADDRESS FE
80   IF ACKNOWLEDGE RECEIVED GOTO 100
85   IF TIMER LIMIT THEN GOTO 90 ELSE GOTO 80
90   SEND ACKF TO HOST
100  POLL = POLL + 1
110  IF POLL <> 4096 THEN GOTO 20
120  END
```

The following is a simplified code listing implementing the flow chart of FIG. 3.20

```
05   ADDRESS = FE
10   TMATCH = 0
20   IF CONFIG NOT RECEIVED THEN GOTO 225
30   TCOUNT = 0
40   SCOUNT = 0
50   IF CONFIG RECEIVED THEN GOTO 90
60   IF ASSIGN NOT RECEIVED THEN GOTO 50
70   IF TYPE = TNUMBER AND SERIAL = SNUMBER
     THEN ADDRESS = SID ELSE GOTO 50
80   END
90   IF TMATCH = 1 THEN 120
100  IF TCOUNT <> TYPE THEN 130
110  TMATCH = 1
120  IF SCOUNT = SERIAL THEN SEND REQUEST SID
130  SCOUNT = SCOUNT + 1
140  IF SCOUNT < 16 GOTO 50
160  SCOUNT = 0
170  IF TCOUNT = 256 THEN GOTO 05
180  TCOUNT = TCOUNT + 1
190  GOTO 50
```

Thus while a preferred embodiment of the present invention has been shown and described, it will be apparent to those skilled in the art that many changes and modifications may be made without departing from the invention in its broader aspects. It is therefore intended that appended claims cover all such changes and modifications as fall within the true spirit and scope of the present invention.

I claim:

1. A computer system comprising:

a bus;

a programmable host computer adapted to access said bus for purposes of sending and receiving messages and addresses thereon, said host computer programmed to transmit on said bus a sequence of COUNT messages each accompanied by a universal address, to receive REQUEST messages transmitted on said bus, and to transmit on said bus an ASSIGN message accompanied by said universal address in response to each received REQUEST message, each ASSIGN message conveying a unique device address such that the device address conveyed by each ASSIGN message differs from the device address conveyed by every other ASSIGN message; and a plurality of programmable peripheral devices, each adapted to access said bus for purposes of sending and receiving messages and addresses thereon, said host computer programmed to transmit on said bus and each peripheral device including memory means for storing a device address and for storing a poll number, the poll numer stored in each memory means differing from the poll number stored in every other memory means, each peripheral device being programmed to receive messages transmitted on said bus by said host computer including messages accompanied by an address matching the device address stored in said memory means and to receive said COUNT and ASSIGN messages accompanied by said universal address, to maintain a count of the number of COUNT messages received, to compare the count with the poll number stored in said memory means, to transmit a REQUEST message to said host computer when the count reaches a value determined according to said poll number, and to store in said memory means the device address conveyed by the first ASSIGN message received after transmitting said REQUEST message to the host computer, wherein the poll number stored in said memory means included in each peripheral device incudes a first portion indicating the nature of the peripheral device, and a manually adjustable second portion of value such that memory means included in all peripheral devices of similar nature store poll numbers having similar first portions and dissimilar second portions, and such that all memory means included in dissimilar peripheral devices of dissimilar nature store poll numbers having dissimilar first portions, and wherein each said REQUEST message transmitted by each peripheral device conveys data indicating the nature of the peripheral device according to the first portion of the poll number stored in the memory means included in the peripheral device.

2. The computer system according to claim 1 wherein said memory means included in at least one of said plurality of peripheral devices comprises a read only memory for storing said first portion of said poll number.

3. The method according to claim 1 wherein said memory means included in at least one of said plurality of peripheral devices comprises manually operable switch means having multiple switching states, each switching state providing signals representing a different value of said second portion of said poll number.

4. For a computer system of the type having a plurality of peripheral devices and a host computer connected to a common bus, said host computer including first memory means and adapted to carry out instructions stored in said first memory means and to transmit messages and addresses over said bus, each peripheral device including second memory means and processing means, said processing means adapted to carry out instructions stored in said second memory means, to receive messages transmitted over said bus by said host computer including messages accompanied by an address matching a device address stored in said second memory means and messages accompanied by a universal address, and to transmit messages to said host computer over said bus, a method permitting said host computer to determine the nature of each peripheral device and to provide device addresses for storage in said second memory means included in said peripheral devices, the method comprising the steps of:

storing a poll number in said second memory means included in each peripheral device, the poll number including a first portion indicating the nature of the peripheral device and a manually adjustable second portion of value such that all peripheral devices of similar nature store in their second memory means poll numbers having a similar first portions and dissimilar second portions, and such that peripheral devices of dissimilar nature store in their second memory means poll numbers having dissimilar first portions;

storing instructions in said first memory means for causing said host computer to transmit a sequence of COUNT messages over said bus, each COUNT message accompanied by said universal address so that each COUNT message is received by each peripheral device processing means;

storing instructions in said second memory means of each peripheral device for causing the processing means of the peripheral device to maintain a count of the number of COUNT messages received from said host computer, to compare the count with the poll number stored in the second memory means included in said peripheral device, and to transmit a REQUEST message to said host computer when the count reaches a value determined according to said poll number, each said REQUEST message conveying data indicating the nature of said each peripheral device according to the first portion of the poll number stored in the second memory means of the peripheral device;

storing instructions in said first memory means for causing said host computer to transmit on said bus an ASSIGN message in response to each REQUEST message, each ASSIGN message conveying a different device address and accompanied by said universal address so that each ASSIGN message is received by each peripheral device processing means; and storing instructions in said second memory means of each peripheral device for causing the processing means of said peripheral device, in response to a first ASSIGN message received after transmitting a REQUEST message to the host computer, to store the device address conveyed by said first ASSIGN message in the second memory means included in the peripheral device.

5. The method according to claim 4 wherein the second memory means included in at least one of said plurality of peripheral devices comprises a read only memory, and wherein the step of storing a poll number in said second memory means comprises the substep of storing said poll number in said read only memory.

6. The method according to claim 5 wherein said memory means included in said at least one of said plurality of peripheral devices further comprises register means for storing a number and manually operable switch means having multiple switching states, each switching state representing a different quantity, and wherein the step of storing said poll number in said second memory means of the at least one peripheral device comprises the substeps of:

manually operating said switch means so as to place said switch means in a particular switching state; and storing instructions in said read only memory for causing the processing means of said at least one of said plurality of peripheral devices to determine the second portion of said poll number according to said quantity represented by the switching state of said switch means and to store said second portion of said poll number in said register means.

* * * * *